United States Patent
Kamath et al.

(10) Patent No.: US 8,199,767 B2
(45) Date of Patent: Jun. 12, 2012

(54) METHOD AND APPARATUS FOR ADAPTIVE TIME DIVISION MULTIPLEXING ON A MULTI-CHANNEL WIRELINE MEDIUM WITH COLOCATED TRANSCEIVERS

(75) Inventors: Purushotham Kamath, San Jose, CA (US); James S. Cho, Mountain View, CA (US); Prem Kumar, Saratoga, CA (US); Matthew Smith, San Jose, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 247 days.

(21) Appl. No.: 12/118,635

(22) Filed: May 9, 2008

(65) Prior Publication Data

US 2009/0279565 A1    Nov. 12, 2009

(51) Int. Cl.
*H04B 7/212*    (2006.01)
(52) U.S. Cl. .................................. 370/442; 370/458
(58) Field of Classification Search .................. None
See application file for complete search history.

(56) References Cited

U.S. PATENT DOCUMENTS

| | | | |
|---|---|---|---|
| 6,014,385 A * | 1/2000 | Ayanoglu et al. | 370/458 |
| 6,087,878 A | 7/2000 | Suzuki et al. | |
| 6,097,707 A | 8/2000 | Hodzic et al. | |
| 7,167,717 B1 | 1/2007 | Goren | |
| 2002/0071413 A1* | 6/2002 | Choi | 370/337 |
| 2003/0114153 A1* | 6/2003 | Shaver et al. | 455/424 |
| 2004/0114563 A1* | 6/2004 | Shvodian | 370/347 |
| 2004/0131039 A1* | 7/2004 | Benveniste | 370/346 |
| 2007/0161364 A1* | 7/2007 | Surineni et al. | 455/343.4 |
| 2007/0220062 A1 | 9/2007 | Carberry et al. | |
| 2007/0233776 A1* | 10/2007 | Palm | 709/201 |
| 2008/0098133 A1 | 4/2008 | Shaanan et al. | |

* cited by examiner

*Primary Examiner* — Yemane Mesfin
*Assistant Examiner* — Khoa Huynh
(74) *Attorney, Agent, or Firm* — Mahamedi Paradice Kreisman LLP; William L. Paradice, III

(57) ABSTRACT

A wireline communications circuit using transceivers compatible with a wireless communications protocol is disclosed using access points and stations in an adaptive Time Division Multiple Access scheme for a multi-channel medium with colocated transceivers. Methods of operating an access point and a station, their implementations as chips and the implementation of a chip for either the access point or station are further disclosed.

24 Claims, 10 Drawing Sheets

Time used in increments of Time steps

METHOD AND APPARATUS FOR ADAPTIVE TIME DIVISION MULTIPLEXING ON A MULTI-CHANNEL WIRELINE MEDIUM WITH COLOCATED TRANSCEIVERS

TECHNICAL FIELD

This invention relates to the use of colocated transceivers in a multi-channel wireline medium such as a coaxial cable.

BACKGROUND OF THE INVENTION

This patent application focuses on the use of colocated transceivers using a multi-channel wireline physical media such as coaxial cable where the frequency separation between channels may be relatively small. The typical example would be the use of colocated transceivers designed for wireless networks, on a coaxial medium using a wireless channel allocation scheme where adjacent channel separation is small. This is not a well-explored technical area. The problems to be discussed are not well known as of the time of filing this patent application.

The general area of time division multiple access protocols has been active for several years as well, however the application of time division multiple access techniques on a multi channel wireline network with colocated transceivers with relatively little channel separation and transceivers favored by wireless network standards is not well known, nor are the problems associated with such techniques as of the time of filing this patent application.

SUMMARY OF THE INVENTION

As used herein, a wireline communications circuit will support at least two access points and at least two stations communicating across a wireline medium using transceivers. The access points may be "colocated", i.e., the distance between the access points may be small when compared to the distance between the access points (APs) and the stations (STAs). Each access point may communicate with one or more of the stations and each station may communicate with a single access point. The communication between an access point and its stations uses a frequency band referred to herein as a channel. Each access point uses a separate channel to communicate with its stations. The frequency separation between channels may be small. The wireline medium may include, but is not limited to at least one of the following: a coaxial cable, a fiber optic cable and a twisted pair cable. The transceivers may comply with a wireless protocol that may include a version of the IEEE 802.11 communications standard.

Three problems have been found in using wireless protocol transceivers in the wireline communications circuit. The first problem is that if one access point transmits while another access point receives, its transmission interferes with the other access point's reception, the receiver's front end may need to handle unusually strong signals, often making it insensitive to the weaker signals it is trying to receive. This problem occurs because the access points are colocated, and may be called the "Adjacent Channel Interference" problem. One approach to solving this problem is the use of a Time Division Multiple Access (TDMA) protocol to manage transmissions and receptions by the access points to remove the possibility of this first problem arising. The same TDMA schedule must be used by all the access points to ensure that the access points all transmit and receive in synchrony. The access management units will be referred to as frames. As used herein, frames may or preferably, may not be fixed in duration.

However, the TDMA approach may have inherent inefficiencies. STAs may not need to transmit or receive at a constant rate. For example, Internet access tends to be in bursts for both uplink and downlink. A second problem is the waste of bandwidth in a fixed uplink-downlink scheme when no station needs an uplink frame. And a third problem is the bandwidth waste when the access point has no downlink frame to transmit to a station.

By implementing a solution to all of these problems, an adaptive TDMA scheme for the wireline communication circuit is disclosed that insures the multi-channel wireline communications circuit is synchronized across channels, thereby solving the Adjacent Channel Interference problem and simultaneously saving the otherwise lost bandwidth from inactive uplink or downlink frames.

Embodiments of the invention include a method of operating an access point, a method of operating a station, an integrated circuit (chip) implementing the access point component of a wireline communications circuit, a chip implementing the station component, and a chip that may implement either the access point or the station component.

The method of operating the access point includes steps: Transmit a beacon and a schedule on the wireline medium coupled to the access point to synchronize at least one station acting as a client to the access point by initiating a TDMA sequence of uplink and downlink frames. The TDMA sequence may include two phases: An "Uplink Data Transfer Phase" where stations transmit frames to the access point and a "Downlink Data Transfer phase" where access points transmit frames to the stations. For efficiency, the Uplink Data Transfer Phase may precede the Downlink Data Transfer Phase, although that is not a requirement. First, determine when all stations transmitting to this AP have completed transmitting their uplink frames by monitoring the uplink transmissions for regular frames or Relinquish frames. Raise a signal to other APs that the uplink data transfer phase is complete. Second, wait for a signal from all access points that they have completed their uplink transmission stage. On receipt of this signal begin the Downlink Data Transfer Phase. Third, determine when all downlink frames transmitted to the stations are completed. Raise a signal to all other access points that downlink transmissions are completed. Fourth, wait for a signal from all access points that they have completed their Downlink Data Transfer Phase. On receipt of this signal begin a new phase by transmitting a new beacon and a schedule.

The TDMA sequence may further include a reservation phase and the access point may further receive at least one association request from a station during the reservation phase to further schedule the uplink and downlink frames.

During an uplink frame, the access point may receive an uplink transmission from a station, where the uplink transmission includes data and/or an acknowledgement from the station of a previously sent downlink transmission to the station and/or a relinquish message to relinquish further use of the uplink frame.

The method of operating the station includes the steps: Receive a beacon and the schedule establishing uplink and downlink frames in the TDMA sequence. First, if a frame is available for transmission in the uplink frame time slot, then an uplink frame is transmitted. Otherwise, a "Relinquish" frame is transmitted. Second, if a "Relinquish" frame is received from another station, accordingly adjust the TDMA sequence to transmit another uplink frame earlier.

The TDMA sequence may further include a reservation phase in which the station may direct its transmitter to send at least one association request to further schedule the uplink and downlink frames.

During an uplink frame, the station may further direct the transmitter to send an upload of data and/or an acknowledgement of a previously received download and/or a relinquish message to relinquish further use of the uplink frame.

The chip implementing the access point includes a transmitter and a receiver and a processor controllably coupled to the transmitter and to the receiver, which operates as follows:

The processor directs the transmitter to send the beacon and the schedule on the wireline medium to initiate the TDMA sequence of uplink frames and downlink frames based upon the time step. The processor first signals to other access points and moves ahead the TDMA schedule in response to first determining that the uplink data transfer phase is complete And second the processor signal to other access points and moves ahead the TDMA schedule in response to the second determining that the downlink data transfer is complete.

The chip implementing the station includes a transmitter and a receiver compatible with a wireless protocol and a second processor controllably coupled to the transmitter and to the receiver, which operates as follows: The second processor directs the receiver to receive the beacon and the schedule establishing uplink and downlink frames. If a frame is available for transmission in the uplink frame time slot, then the second processor directs an uplink frame to be transmitted by the transmitter. Otherwise, a "Relinquish" frame is transmitted. Second, if a "Relinquish" frame is received from another station, the second processor accordingly adjusts the TDMA sequence to transmit another uplink frame earlier.

The chip implementing either the access point or the station includes a transmitter and a receiver compatible with a wireless protocol, and a third processor controllably coupled to the transmitter and to the receiver and communicatively coupled to the mode sensor, which operates as follows: The third processor operates the transmitter and the receiver as an access point as described above in response to installation of a first program system into a computer readable memory accessibly coupled to a computer. And the third processor operates the transmitter and the receiver as a station as described above in response to installation of a second program system into the computer readable memory.

DETAILED DESCRIPTION

This invention relates to the use of wireless transceivers in a wireline medium such as a coaxial cable. A transceiver includes, but is not limited to, a transmitter and a receiver. A wireline communications circuit may support at least two access points and at least two stations communicating across a multi-channel wireline medium using transceivers compatible with a wireless protocol. This description will begin by showing an example of the invention's adaptive Time Division Multiple Access (TDMA) protocol that can schedule uplinks and downlinks and can adapt to unused uplink frames and to unused downlink frames. Further preferred refinements will then be discussed that incorporate a reservation phase in the TDMA frame sequence, and/or bundle acknowledgements by units for their previously received frame when they next transmit, and/or the relinquishment of the remainder of an uplink frame by a client, known herein as a station.

Figure 1:
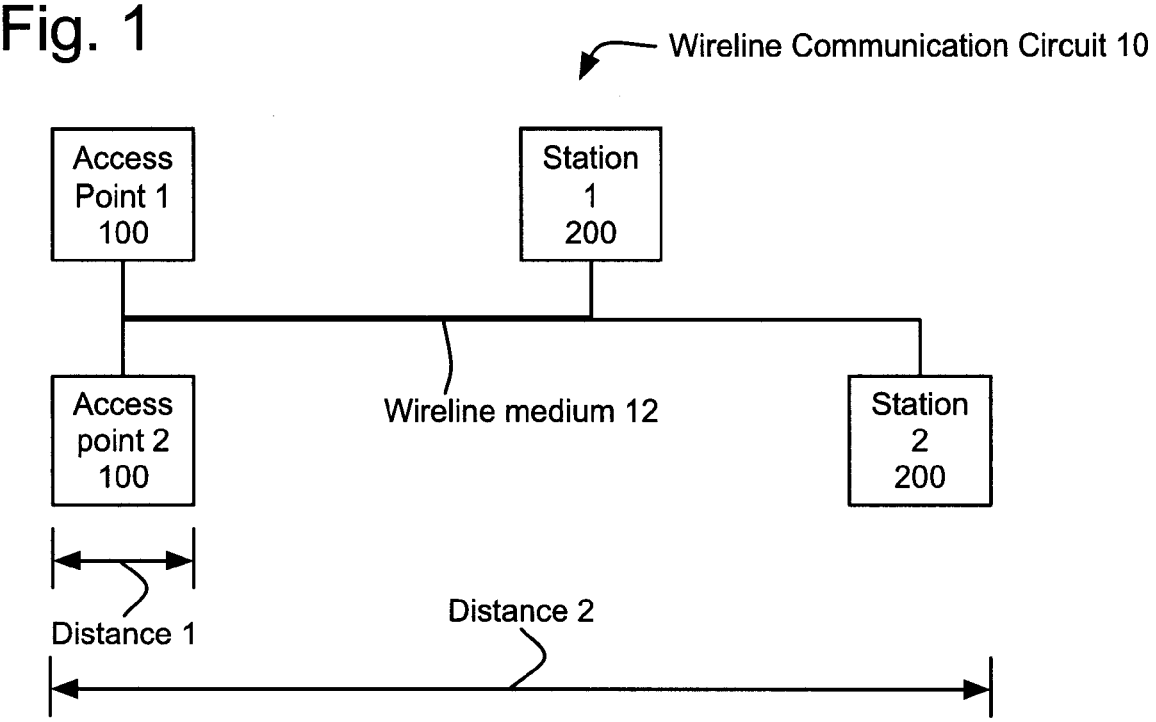
FIG. 1 shows a wireline communication circuit supporting at least two access points and at least two stations communicating across a wireline medium using transceivers compatible with a wireless protocol.

Referring to the drawings more particularly by reference numbers, FIG. 1 shows a wireline communications circuit 10 supporting at least two access points 100 and at least two stations 200 communicating across a wireline medium 12 using transceivers compatible with a wireless protocol. Each access point communicates on a separate channel. Channels may include separate portions of a frequency spectrum. For example, a first channel may use a frequency from 2.401 GHz to 2.423 GHz and a second channel may use a frequency from 2.426 GHz to 2.448 GHz. Each station communicates with one of the access points. The wireline medium may include, but is not limited to at least one of the following: a coaxial cable, a fiber optic cable and/or a twisted pair cable. The wireless protocol may include a version of the IEEE 802.11 communications standard. In many implementations, the access points may be located within less than five meters shown as distance 1, and the stations may be as much as 300 meters distant from the access points as shown by distance 2.

Three problems have been found in using wireless protocol transceivers in the wireline communications circuit 10. A first problem is that if a first access point transmits using a first channel, while a second access point receives on a second channel. The first access point's transmission may interfere with the second access point's reception, in that second access point's receiver front end may need to handle unusually strong signals, often making it insensitive to the weaker signals it may be trying to receive. This is particularly the case when the first and second channels are relatively close together in frequency. An example of this problem is shown in FIG. 2 and a solution to this problem is shown in FIG. 3 as a sequence of frames in a TDMA protocol sequence.

Figure 4:
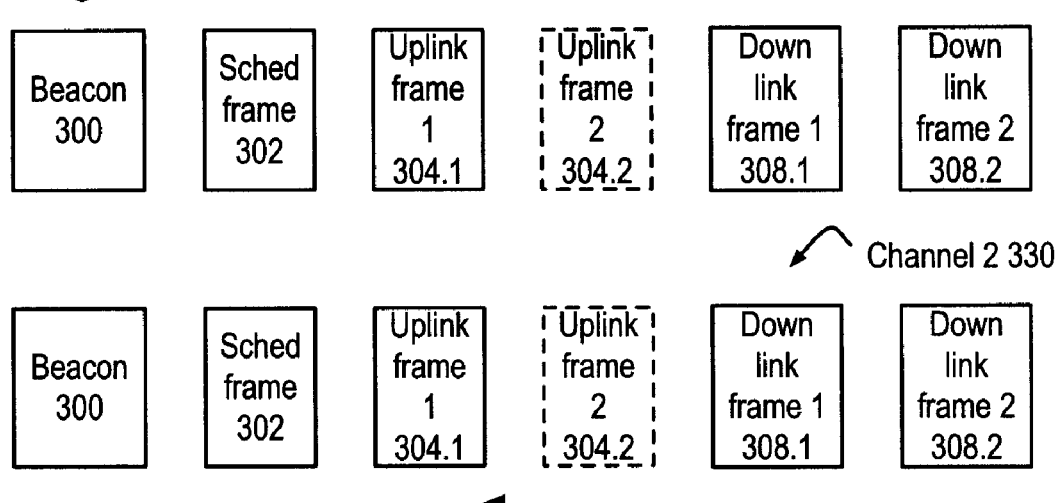
FIG. 4 shows an example of the second problem, wasting bandwidth on a frame not needed for any uplink operation, or upload. The invention first moves successor frames forward to recover the wasted bandwidth as shown in FIG. 5.
Figure 5:
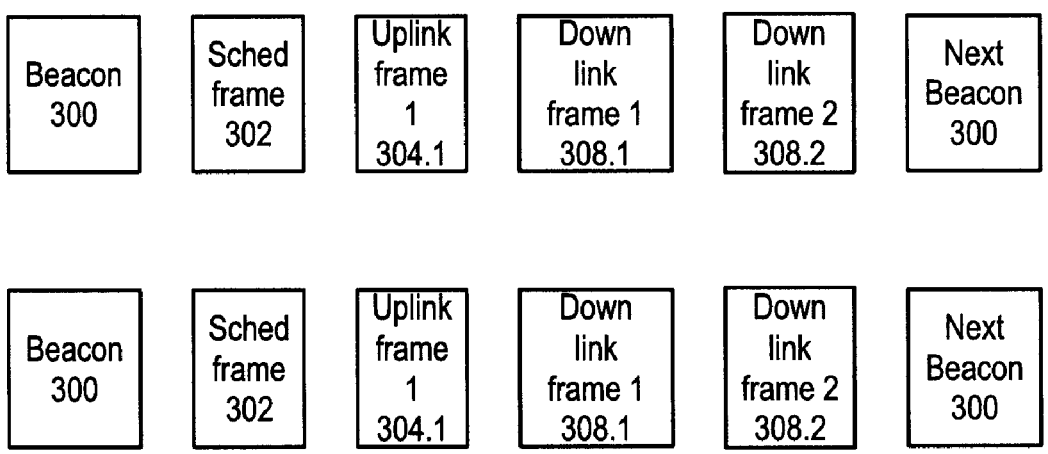
Figure 6:
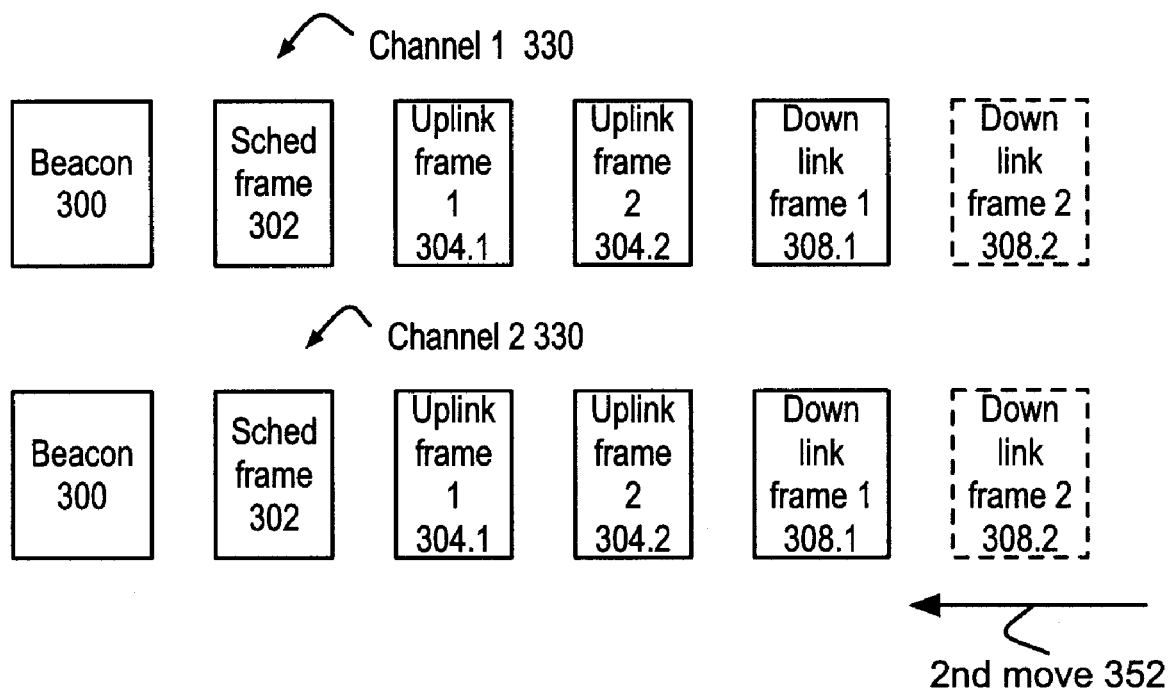
FIG. 6 shows an example of the third problem, wasting bandwidth on a frame not need for any downlink operation, or download. The invention second moves successor time slots forward to recover the wasted bandwidth as shown in FIG. 7.
Figure 7:
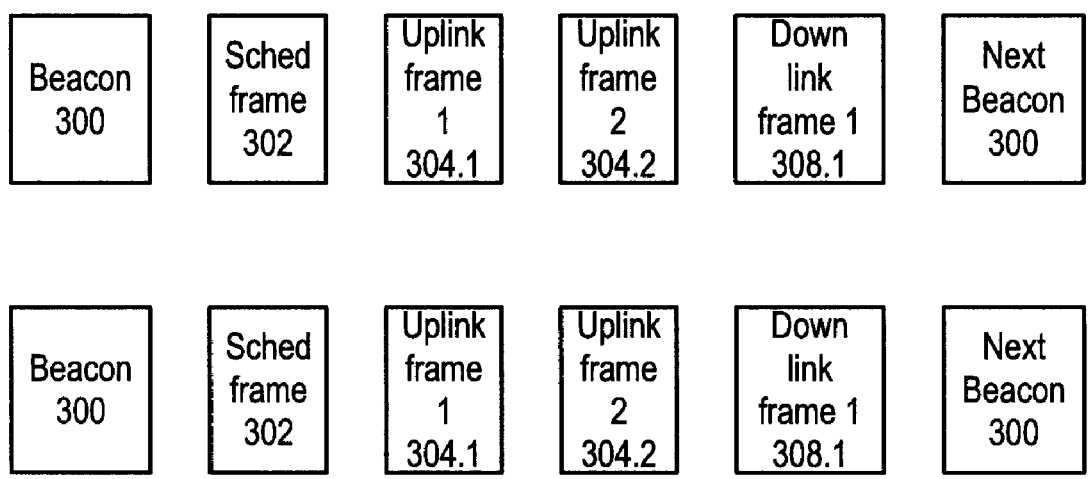

A TDMA protocol may provide a solution to the adjacent channel interference problem described above. However the TDMA schedule may need to be synchronized across colocated access points (i.e., access points sharing a wireline medium). Also, network access by the stations 200 may not be at a constant rate. For example, Internet access tends to be in bursts for both uplink and downlink operations, thus uplink and downlink operations may not be constant. A second problem is the waste of bandwidth in a fixed uplink-downlink scheme when no station needs an uplink frame as shown in FIG. 4. The bandwidth saving of the invention's solution to this problem is shown in FIG. 5. A third problem is the bandwidth waste when the access point has no downlink frame to transmit to a station as shown in FIG. 6. FIG. 7 shows the bandwidth saving of the invention's solution to the third problem.

In implementing a solution to all three of these problems, an adaptive time division multiplexing is described for the wireline communication circuit 10 that insures communication between the access points and the stations' front end receiver is not saturated and saves otherwise lost bandwidth from inactive uplink or downlink frames.

Figure 2:
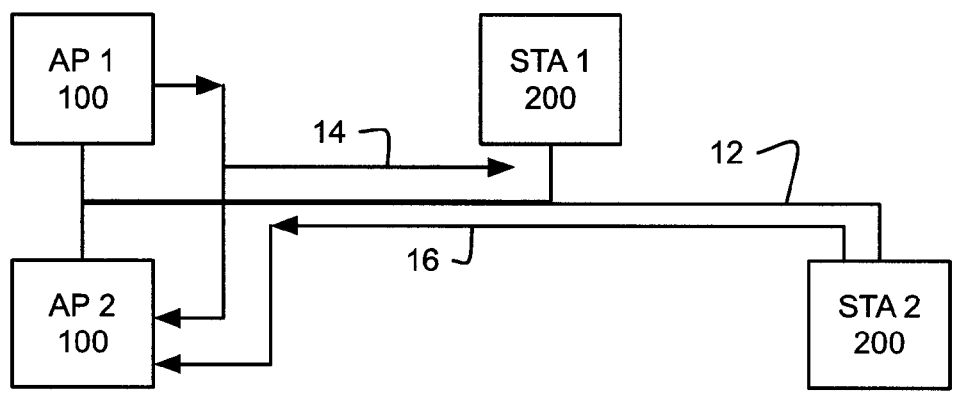
FIG. 2 shows an example of the first problem with the wireline communication circuit.
Figure 3:
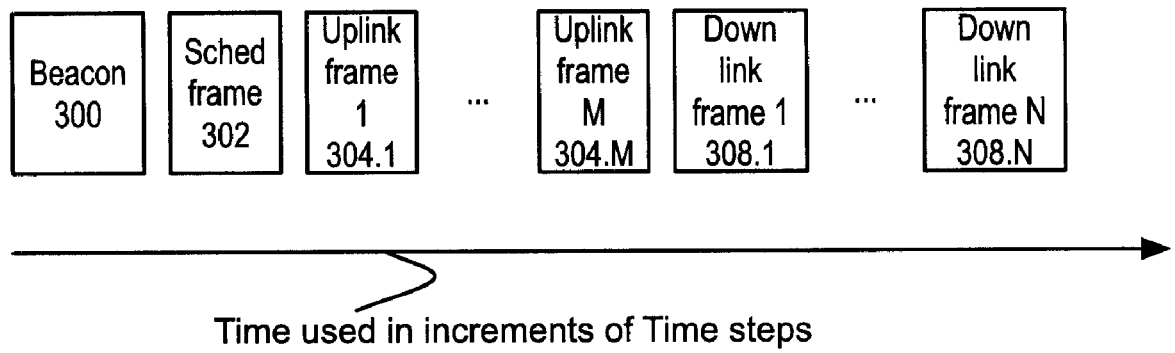
FIG. 3 shows a solution to the first problem in a Time Division Multiple Access (TDMA) scheme using time in increments of a shared time step with components of a beacon, schedule, uplink frames, uplink acknowledgement, downlink frames and downlink acknowledgement.

FIG. 2 shows an example of the first problem. If access point one transmits 14 while a second access point receives 16, its receiver front end is swamped by the other access point's transmission, pushing its front end into saturation. One approach to solving this problem is the use of a time division multiple access protocol to manage transmissions and receptions by the access points to remove the possibility of this first problem situation arising. The access management units will be referred to as frames.

FIG. 3 shows a frame diagram for a time division multiple access protocol managing the communications between the access points 100 and stations 200 of the wireline communication circuit 10 of FIG. 1. Typically, each access point is assigned a channel $330_{[r1]}$ to which one or more stations are clients. Each access point tends to be closely synchronized with other access points. A typical access cycle includes a beacon phase, an uplink data transfer phase and a downlink data transfer phase. During the beacon phase, each access point broadcasts a beacon 300 and a schedule$_{[r2]}$ 303 in the synchronization frame$_{[r3]}$ 302 on its channel $330_{[r4]}$. The stations may use the beacon and the schedule to align their local clocking to their access point. During the uplink data transfer phase, a station transmits its uplink frames, followed by a succession of other stations transmitting their respective uplink frames, each in its own respective uplink slot. The first uplink transmission takes place in the first uplink frame 304.1. The second uplink transmission in the second uplink frame 304.2, and so on. An uplink transmission frame may include data, an acknowledgement of previous data sent and/or a relinquish instruction. For example, an acknowledgement in frame 304.1 could confirm the reception of data sent by the AP during a previous access cycle. Uplink frames may include data and acknowledgement, acknowledgement and relinquish or just relinquish data. Relinquish frames and relinquish data are described in more detail in conjunction with FIG. 4. Similar to uplink data, during the downlink data transfer phase, the access point transmits a downlink transmission to the first station in the first downlink frame 308.1, a second downlink transmission to the second station in the second downlink frame 308.2, and so on.

However, network access by the stations 200 may not be at a constant rate. For example, Internet access tends to be in bursts for both upload and download.

FIG. 4 shows an example of a second problem with the wireline communication circuit 10, the waste of bandwidth in a fixed uplink-downlink scheme when no station needs an uplink frame. In these exemplary figures, it will be assumed that there are two access points 100, each servicing two stations 200 as clients on separate channels 330. These channels may be physical channels, say at different frequency bands. The invention's solution to this problem is to have the stations send "Relinquish" frames when they have no data to transmit. If the uplink data transfer phase ends sooner than specified in the schedule 303, the access points signal each other through an external means. In one embodiment, access points may signal each other though channel in use flags. When all access points have signaled that their uplink data transfer phase is complete, all access point may begin their downlink data transfer phase. FIG. 4 indicates the access points first move 350 successor frames forward, recovering the active use of the wasted uplink frame as shown in FIG. 5.

FIG. 5 shows the result of the first move 350 of the frames of both channels 330 of FIG. 4 forward when it is determined that no station needs the uplink frame 304.2. This adaptive time division multiplexing of the uplink frames saves the bandwidth that would otherwise be lost. The discussion of various alternatives for determining that a frame is not being used will be postponed till the various hardware embodiments.

FIG. 6 shows an example of a third problem with the wireline communication circuit 10, the waste of bandwidth waste when no station 200 needs a downlink frame 308.2, with the invention's solution being to have the every access point signal other access points through an external means. When all access points have signaled that their Downlink Data Transfer Phase is complete, all access points begin their next Beacon phase. The solution shows the access points second move 352 successor frames forward. FIG. 7 shows the result of the second move of the frames of all of the channels 330 of FIG. 6 when it is determined that no station needs the downlink frame 308.2.

Using the adaptive time division multiple access scheme in the wireline communications circuit 10 solves these three problems. Embodiments of the invention include a method of operating an access point 100, a method of operating a station 200, an integrated circuit (chip) implementing the access point component of a wireline communications circuit, referred to herein as the access point chip 110, a chip implementing the station component, referred to as the station chip 210, and a chip that may implement either the access point or the station component, referred to as the multi-mode chip 310.

The method of operating the access point 100 in the wireline communications circuit 10 includes steps: Generate a beacon 300 and schedule 303 with a transmitter complying with a wireless protocol to synchronize at least one station 200 acting as a client to the access point thereby initiating the time division multiple access sequence of uplink frames 304 and downlink frames 308 in the wireline communications circuit for one channel 330 allocated to the access point. First move 350 ahead the frames in response to first determining during an uplink frame 304 whether no station in the wireline communications circuit wants to transmit uplink frames and signaling all other access points that the uplink transmission phase is complete and receiving a signal from all other access points that their uplink transmission phase is complete. And second move 352 ahead the frames in response to second determining during a downlink frame 308 that there are no frames for transmission to any stations and signaling to all other access points that the uplink data transfer phase is complete and receiving a signal from all other access points that all the uplink data transfer phases are complete.

The method of operating the station 200 in the wireline communications circuit 10 includes the following steps: Receive the beacon 300 and the schedule 303 establishing the uplink frames 304 and downlink frames 308 preferably on one channel 330. First, transmit a "Relinquish frame' if the station has no frames to transmit. Second, move 350 ahead the frames in response to third determining that the schedule 303 has changed because another station has sent a relinquish frame.

Embodiments of the invention include an integrated circuit (chip) implementing the access point 100 component of the wireline communications circuit 10, a chip implementing the station 200 component, and a chip that may implement either the access point or the station component.

Figure 8:
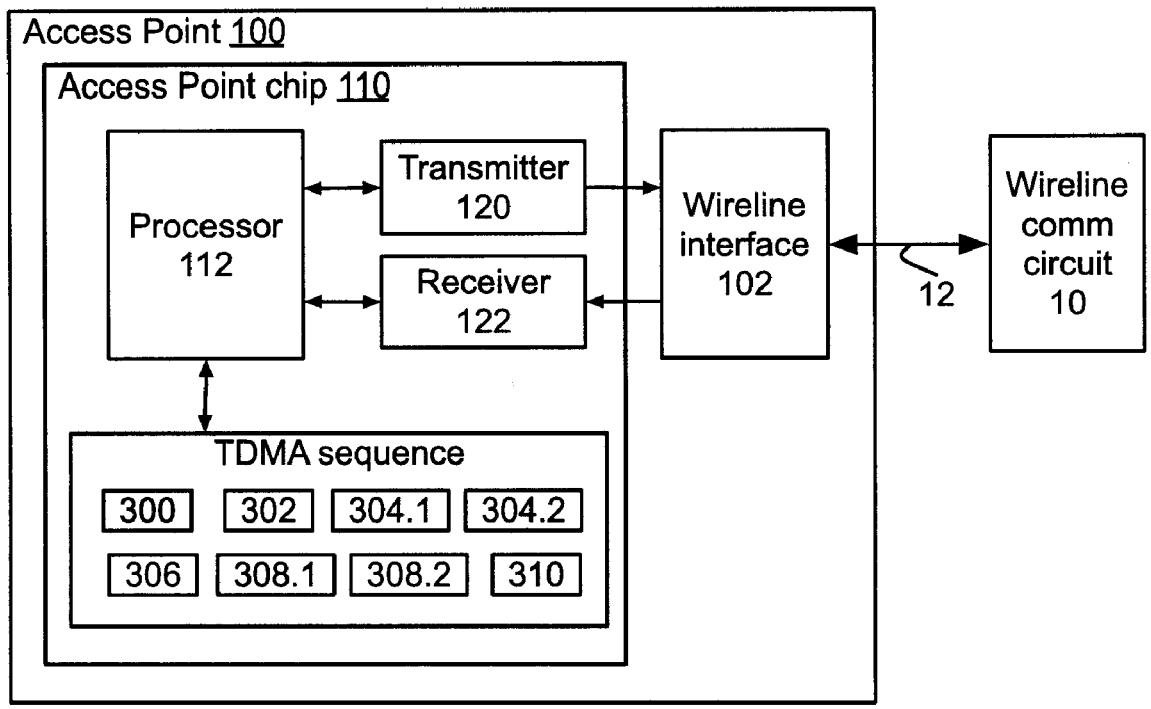
FIG. 8 shows some details of the access point of FIGS. 1 and 2 including an access point chip in accord with the invention.

FIG. 8 shows a simplified block diagram of an example of the access point 100 including a chip referred to herein as an access point chip 110, which includes a transmitter 120 and a receiver 122 compatible with the wireless protocol and a first processor 112 controllably coupled to the transmitter 120 and to the receiver 122. The access point chip 110 operates as follows: The first processor 112 directs the transmitter 120 to send the beacon 300 and the schedule 303 on the wireline medium 12 initiating the time division multiple access sequence of uplink frames 304 and downlink frames 308. The access point 100 begins receiving uplink frames 304 from stations. The first processor 112 receives a signal from all other access points that their uplink transmission phase is complete. Then the first processor 112 first moves 350 ahead the frames in response to first determining during an uplink frame that at least one other station in the wireline communication circuit 10 does not have data to provide in an uplink frame 304. The first processor 112 signals all other access points that the uplink transmission phase is complete. The first processor 112 begins to transmit downlink frames 308. The first processor 112 determines that its downlink data transfer phase is complete. The first processor 112 then signals all other access points that the downlink data transfer phase is complete. The processor receives a signal from all other access points that their downlink data transfer phase is complete. The processor second moves 352 ahead the frames in response to the second determining during a downlink frame that no station can download.

The transmitter 120 and the receiver 122 may interact with a wireline interface 102 to affect and sense the state of the wireline medium 12, thereby affecting and sensing the state of the wireline communications circuit 10. The wireline medium may be a coaxial cable, and the wireline interface may include a coaxial coupler. The wireline medium may be a fiber optic cable and the wireline interface may include a laser.

In further detail, the access point chip 110 includes each component of the TDMA sequence of FIG. 3, in particular, it generates the beacon 300 and schedule 303, receives the uplink packets 304.1 and 304.2, sends, the downlink packets 308.1 and 308.2.

Figure 9:
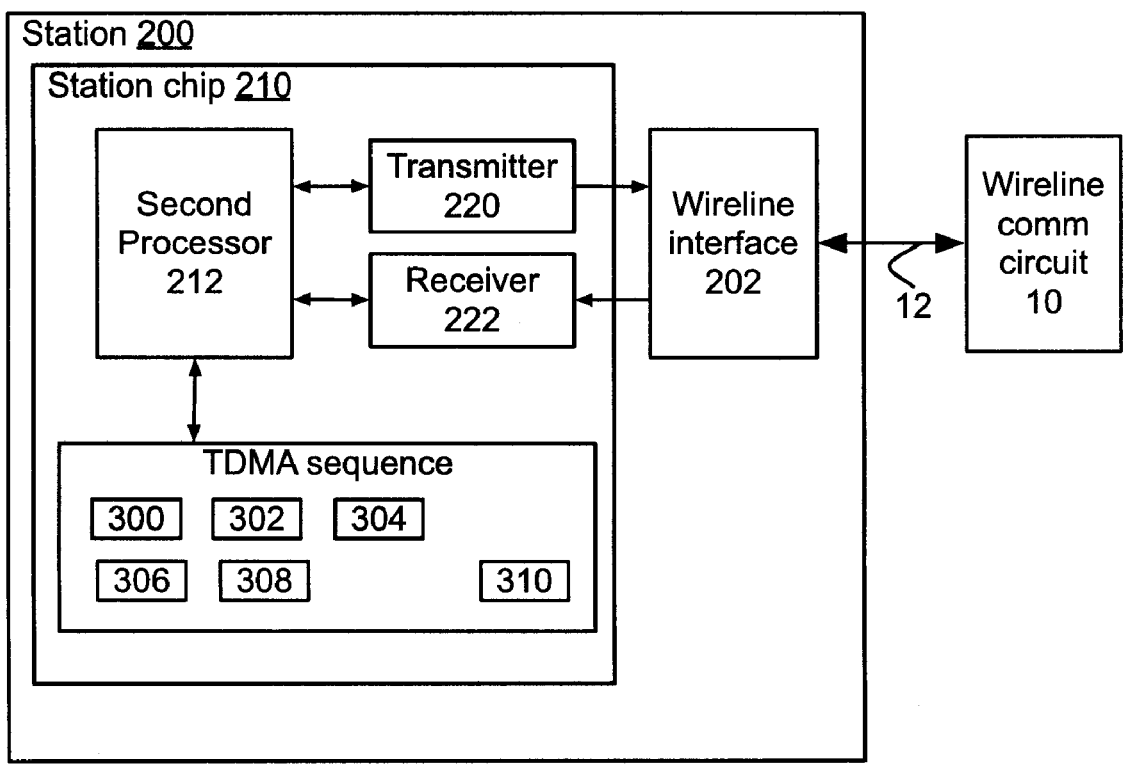
FIG. 9 shows some details of the station of FIGS. 1 and 2 including a station chip in accord with the invention.

FIG. 9 shows a simplified block diagram of the station 200 including a chip referred to as the station chip 210, which includes a transmitter 220 and a receiver 222 compatible with a wireless protocol and a second processor 212 controllably coupled to the transmitter and to the receiver. The station chip operates as follows: The second processor directs the receiver to receive the beacon 300 and the schedule 303 establishing the uplink frames 304 and the downlink frames 308. The second processor 212 first sends a "relinquish frame" to indicate it does not wish to transmit its uplink frame. It moves 350 ahead the frames in response to third determining that another station has sent a "relinquish frame".

The transmitter 220 and the receiver 222 may interact with a wireline interface 202 to affect and sense the state of the wireline medium 12, thereby affecting and sensing the state of the wireline communications circuit 10. The wireline medium 12 may be a coaxial cable, and the wireline interface may include a coaxial coupler. The wireline medium 12 may be a fiber optic cable and the wireline interface may include a laser.

In further detail, the station chip 210 may include some of the component of the TDMA sequence of FIG. 3, in particular, it may receive the beacon 300 and schedule 303, send an uplink packet 304, receive a downlink packet 308, and. In other embodiments that will be described shortly, acknowledgement of a received download may be sent with the next upload in a scheduled uplink frame.

Figure 10:
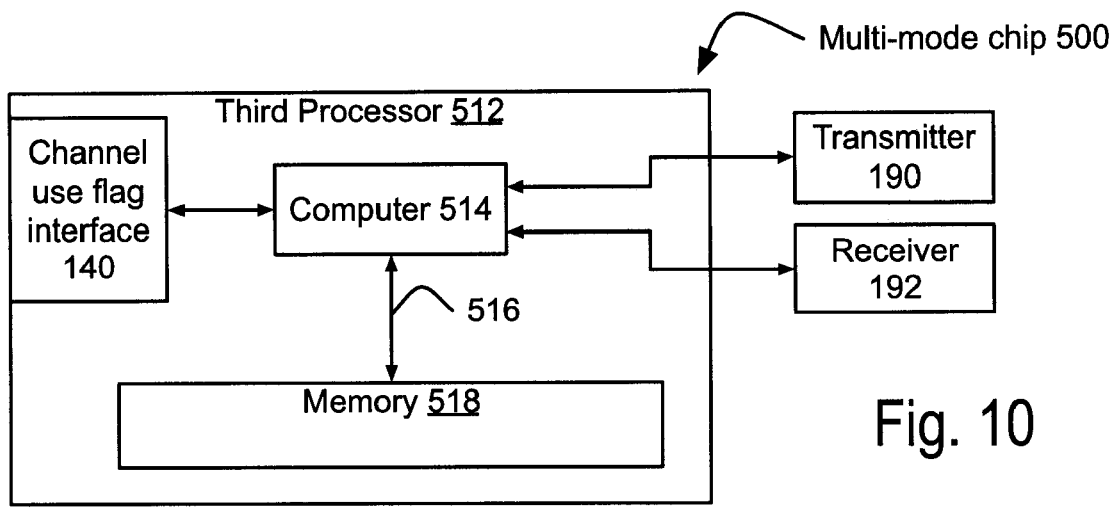
FIG. 10 shows an example of a chip, referred to herein as a multi-mode chip, that can be configured to operate the access point by installing a first program system as shown in FIG. 11 or to operate the station as shown in FIG. 12 by installing a second program system.
Figure 11:
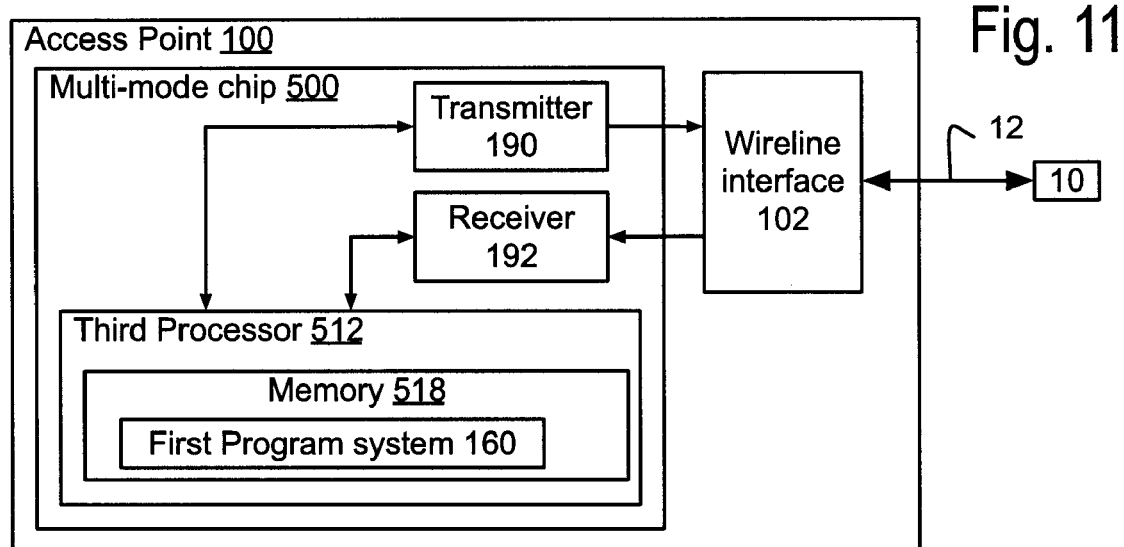
Figure 12:
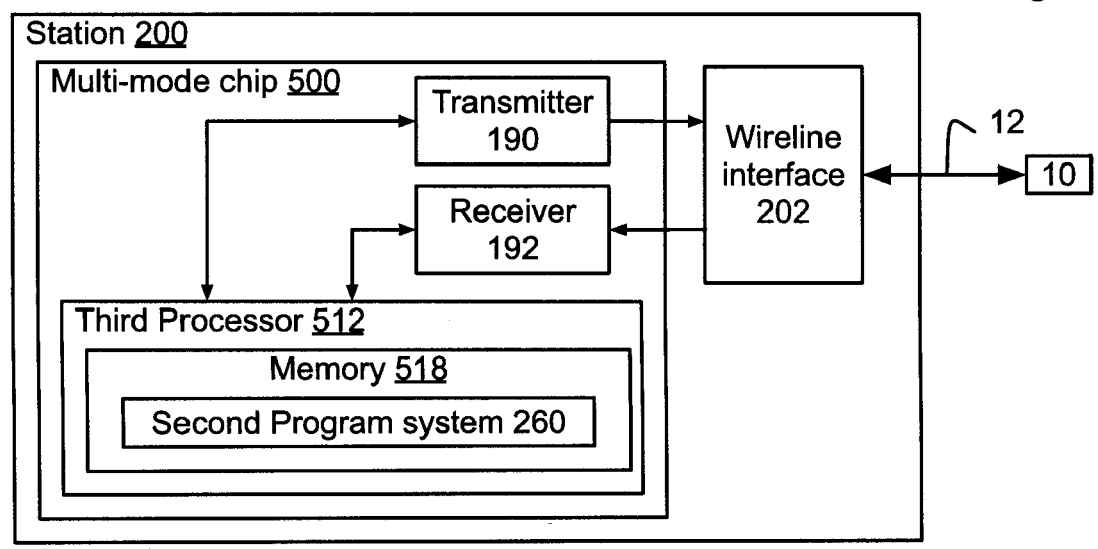

FIG. 10 shows a preferred embodiment of a chip known herein as a multi-mode chip 500 that can be configured to operate the access point 100 as shown in FIG. 11 in response to installation of a first program system 160 in a computer readable memory 518, or to operate the station 200 as shown in FIG. 12 in response to installation of a second program system 260 in the memory. The multi-mode chip may include at least one computer 514 accessibly coupled 516 to the computer readable memory and instructed to operate the transmitter 190 and receiver 192 based upon which program system has been installed. The transmitter and the receiver are compatible with the wireless protocol, and the third processor is controllably coupled to the transmitter and to the receiver.

As used herein, any computer includes at least one data processor and at least one instruction processor instructed by a program system, where each of the data processors is instructed by at least one of the instruction processors. While such embodiments are preferred as of the time of filing the methods operating the access points 100 and stations 200 may also be implemented using at least one finite state machine. As used herein, a finite state machine receives at least one input, maintains and updates at least one state and generates at least one output based upon the value of at least one of the inputs and/or the value of at least one of the states.

Figure 13:
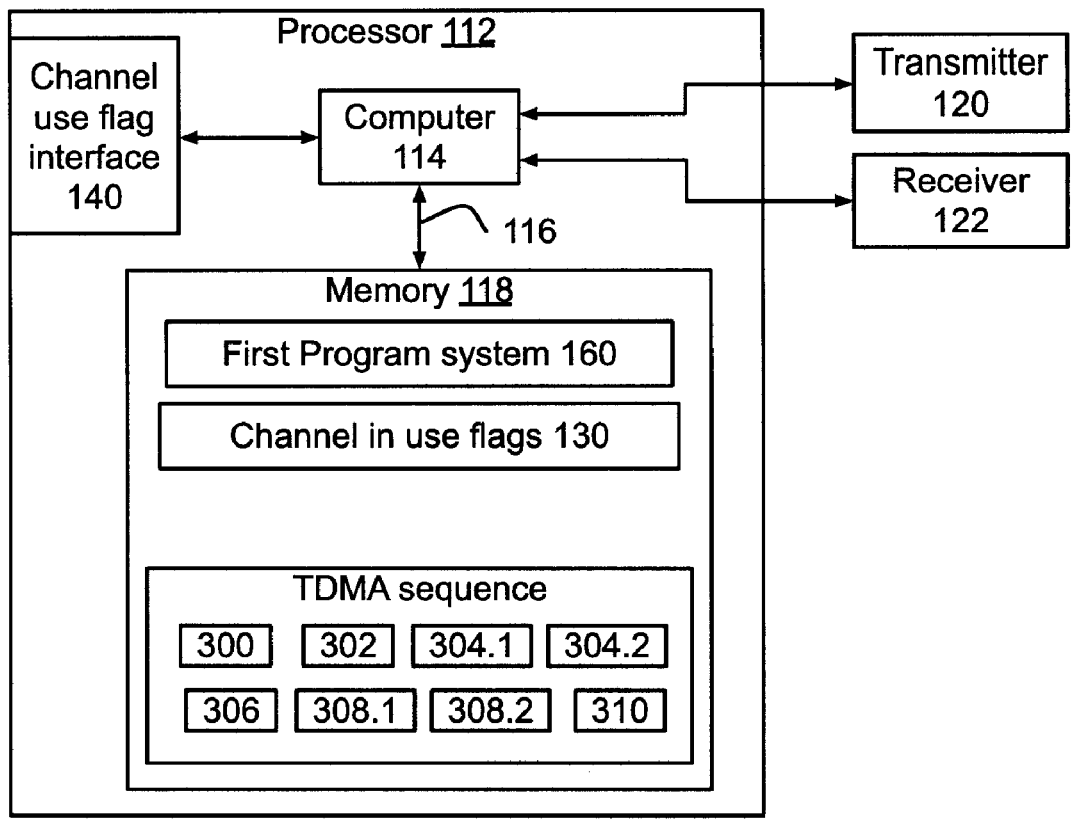
FIGS. 13 to 17 show some details of the access point chip of FIG. 8 and the first program system of FIG. 11.

FIG. 13 shows a block diagram of some details of the access point chip 110 and its first processor 112, including a computer 114 accessibly coupled 116 to a computer readable memory 118 and instructed by a program system 160 including program steps residing in the memory. The memory may further include the TDMA sequence as described above.

The access point chip 110 may further include one or both of a channel strength estimate 132 for each channel 330 and a set of channel in use flags 130. Certain embodiments of access point chip may include pins dedicated to communicating the channel in use flags between the access points 100. Other embodiments may derive the channel strength estimates from the receiver 122.

Figure 14:
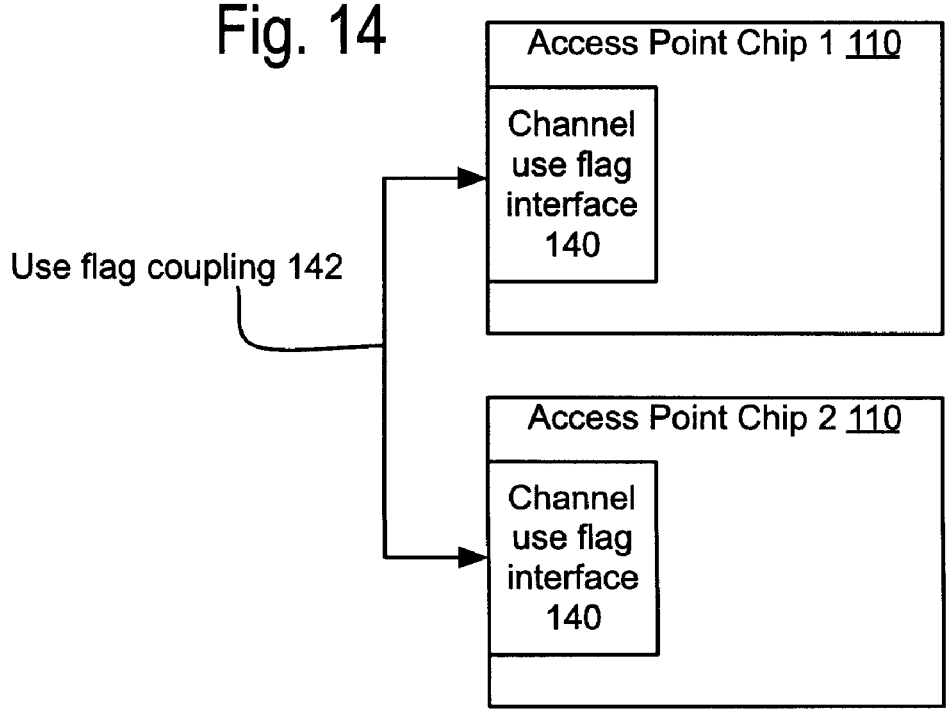

FIG. 14 shows an example of the wireless communication circuit of previous Figures with the first access point chip 110 communicating via a use flag coupling 142 between its channel use flag interface 140 and a channel use flag interface of a second access point chip. The use flag coupling may preferably be a wireline coupling, such as a twisted pair coupling or a ribbon cable, or less preferred, a wireless coupling, such as an infra-red or radio frequency coupling. Note that the multi-mode chip 500 when configured as an access point chip may be similarly coupled and used. The sending and receiving of the use flags between the access points via the use flag coupling serves to notify each access point of the use of the channels other than their own. In certain embodiments, the use flag interface may serve to trigger an interrupt of the processor of the access point. The interrupt may be a non-maskable interrupt.

Some of the following figures show flowcharts of at least one embodiment of the invention's methods, which may include arrows signifying a flow of control, and sometimes data, supporting various implementations. These may include a program operation, or program thread, executing upon the computer or states of a finite state machine. Each of these program steps may at least partly support the operation to be performed. Other circuitry such radio components, specialized encoders and/or decoders, memory management and so on may also be involved in performing the operation. The operation of starting a flowchart refers to entering a subroutine or a macro instruction sequence in the computer or of a possibly initial state or condition of the finite state machine. The operation of termination in a flowchart refers to completion of those operations, which may result in a subroutine return in the computer or possibly return the finite state machine to a previous condition or state. The operation of terminating a flowchart is denoted by a rounded box with the word "Exit" in it.

Figure 15:
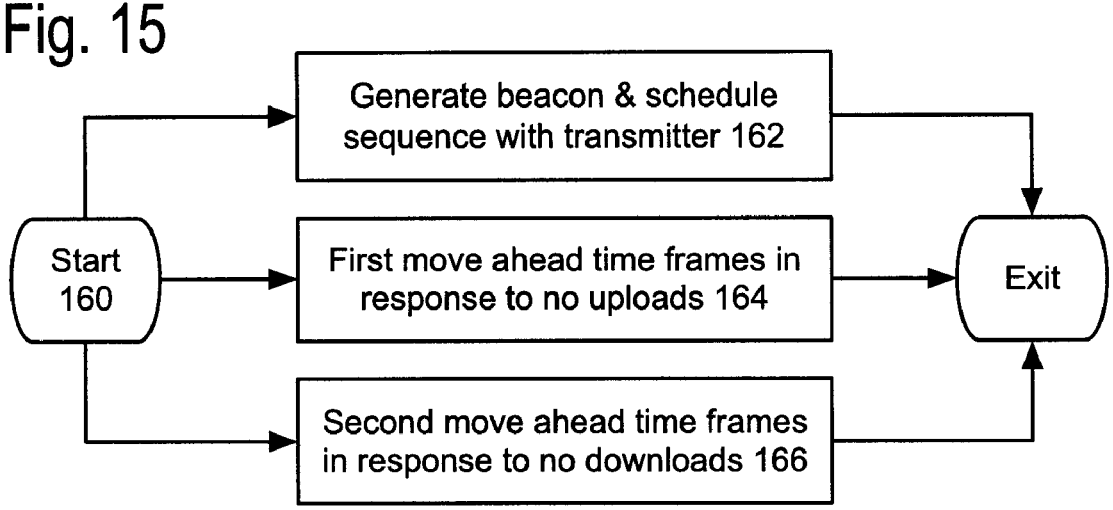

FIG. 15 shows some details of the first program system 160 of FIGS. 11 and 13 including the following program steps: Program step 162 generates the beacon 300 and the schedule 303 with the transmitter complying with the wireless protocol thereby initiating the time division multiple access sequence of uplink frames 304 and downlink frames 308 in the wireline communications circuit for one channel 330 allocated to the access point 100 including the access point chip 110. Program step 164 first moves 350 ahead the frames in response to first determining during an uplink frame 304 whether no station in the wireline communications circuit can upload by signaling the processors on all other access points that the uplink transmission phase is complete and receiving a signal from all other access points that their uplink transmission phase is complete. Program step 166 second moves 352 ahead the frames in response to second determining that its downlink data transfer phase is complete by signaling all other access points that the downlink data transfer phase is complete and receiving a signal from all other access points that their downlink data transfer phase is complete.

Figure 16:
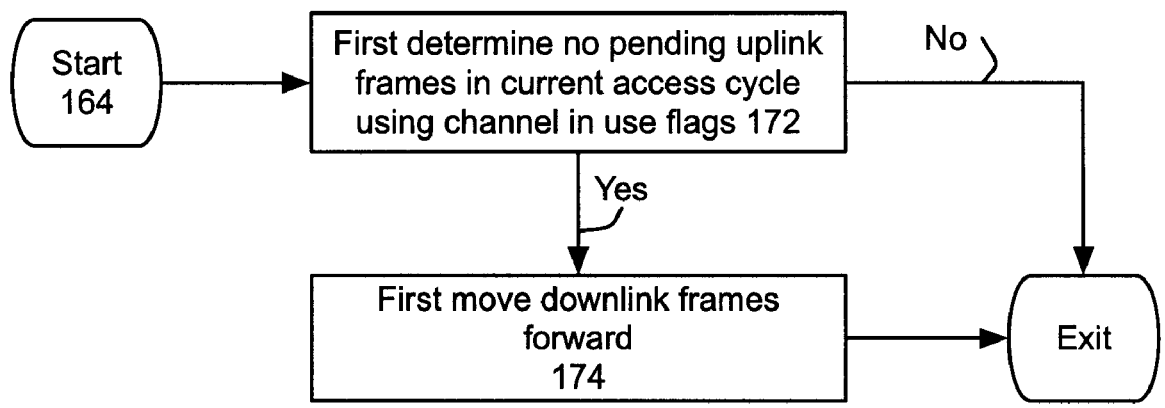

FIG. 16 shows some alternative details of program step 164 of FIG. 15, including the program step 172 first determines there is no pending uplink frames in the current access cycle using the channel in use flags 130 that may be accessed by the computer 114 through the channel use flag interface 140. Program step 174 is executed when this determination is yes, otherwise this program step is exited. Program step 174 first moves downlink frames forward in response to the first determination being yes.

Figure 17:
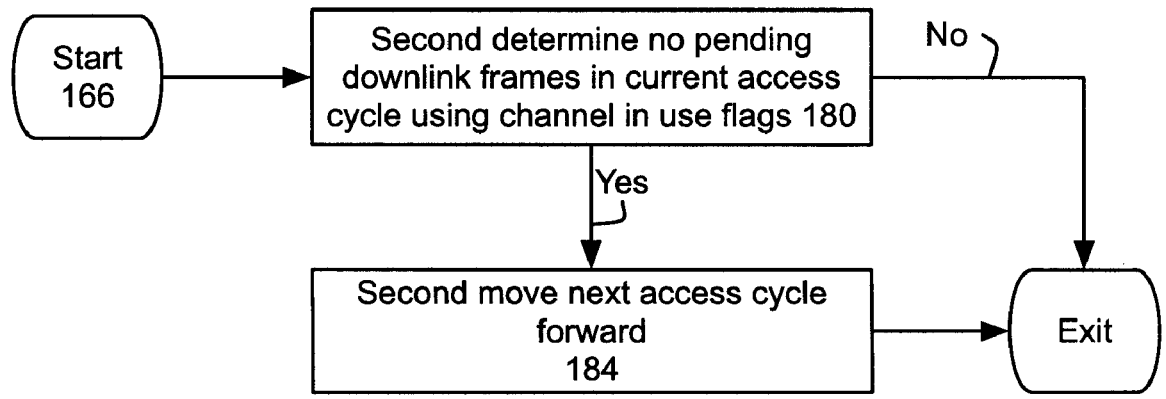

FIG. 17 shows some details of the program step 166 of FIG. 15, including the program step 180, which second determines that there is no pending downlink frames in the current access cycle using the channel in use flags 130 that may be accessed by the computer 114 through the channel use flag interface 140. Program step 184 is executed when this determination is yes, otherwise this program step is exited. Program step 184 second moves the next access cycle forward in response to the second determination being yes.

Figure 18:
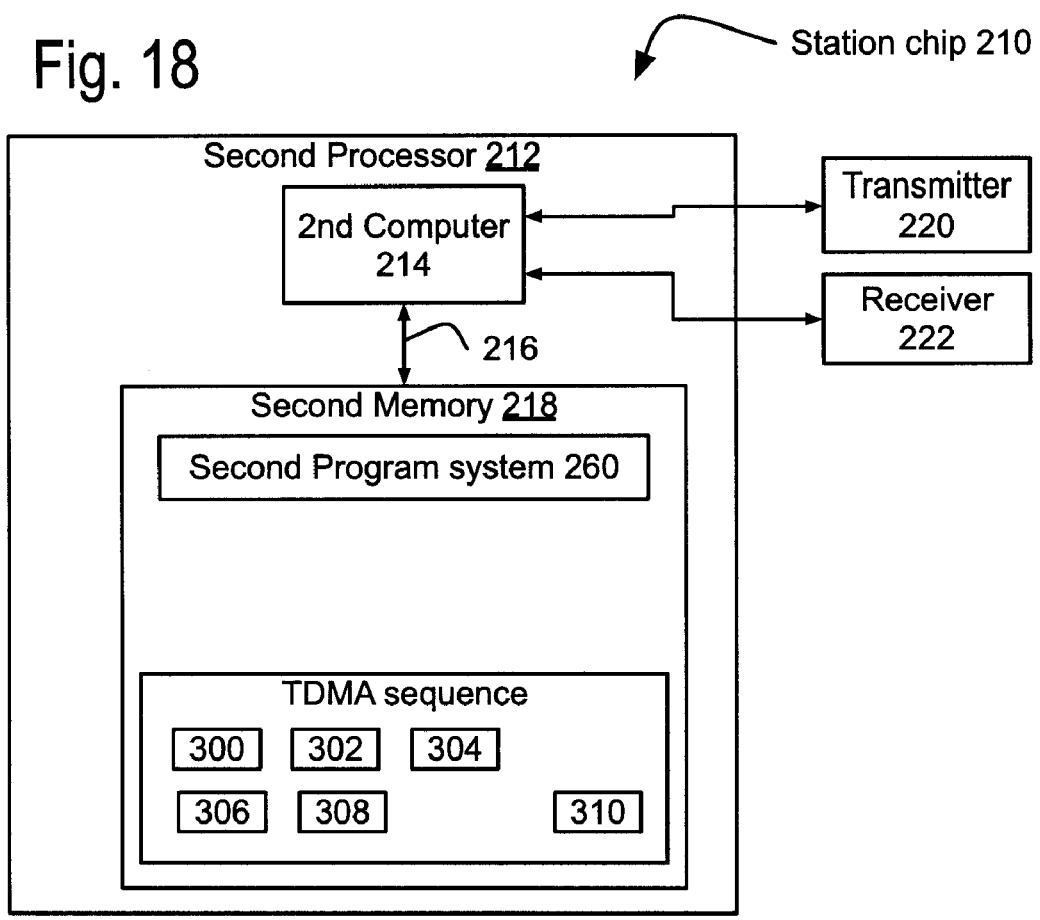
FIGS. 18 and 19 show some details of the station chip of FIG. 9 and the second program system of FIG. 12.

FIG. 18 shows a simplified block diagram of the station chip 210 of FIG. 9 with its second processor 212 further including a second computer 214 second accessibly coupled 216 to a second computer readable memory 218. The second memory includes a second program system 260 to implement the operation of the station 200 as previously discussed. The second memory may further include channel strength estimates 232 similar to the channel strength estimates 132 described for the access point chip 112 of FIG. 12. The second memory may also include at least part of the TDMA sequence as discussed above with regards FIG. 9.

Figure 19:
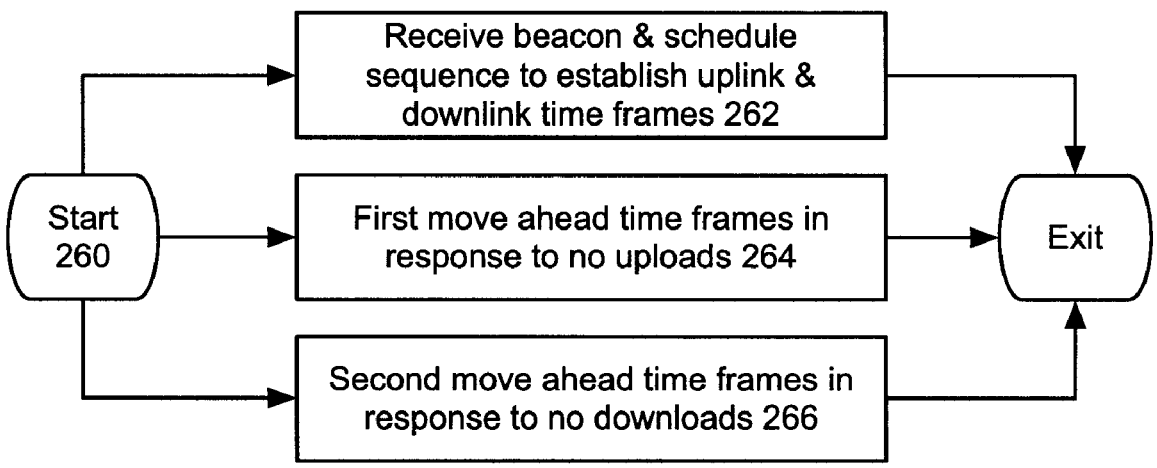

FIG. 19 shows a flowchart of the second program system 260 that may implement the method of operating the station 200 by including the program steps: Program step 262 receives the beacon 300 and the schedule 303 establishing the uplink frames 304 and the downlink frames 308. Program step 264 first moves 350 ahead the frames in response to third determining that there are no active uploads in an uplink frame. And program step 266 second moves 352 ahead the frames in response to fourth determining that there are no active downloads in a downlink frame.

Program step 264 may preferably be implemented in a similar fashion to program step 164 as shown in FIG. 15 and program step 266 may be implemented similarly to program step 166 in FIG. 16.

Further preferred refinements will now be discussed that incorporate a reservation phase in the TDMA frame sequence, and/or bundle acknowledgements by the access points and stations for their previously received frame when they next transmit, and/or the relinquishment of the remainder of an uplink frame by a station.

Figure 20:
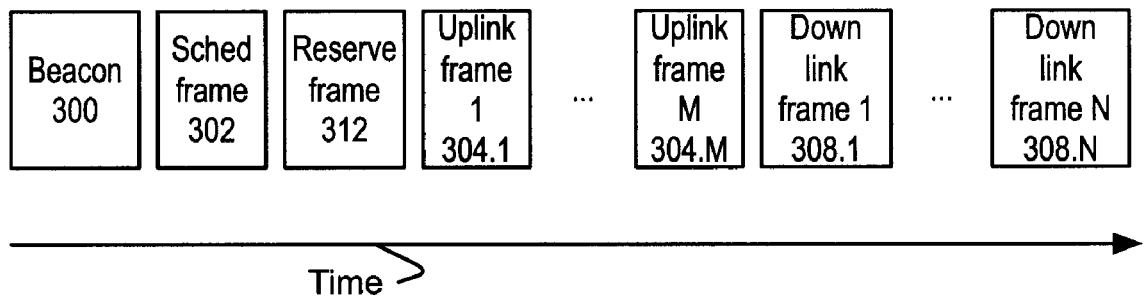
FIGS. 20 to 22 show a refinement of the TDMA scheme of FIG. 3, removing separate acknowledgement frames, adding a reservation frame and incorporating the use a relinquish message in at least some uploads.

FIG. 20 shows a preferred refinement of the TDMA protocol sequence shown in FIG. 3 without separate acknowledgement frames, and further includes a reservation frame 312. In certain embodiments, the beacon 300 and the schedule 303 may be treated as a single frame. The reservation frame may serve to permit the stations 200 to request reservation of uplink frames 304 from an access point 100.

Figure 21:
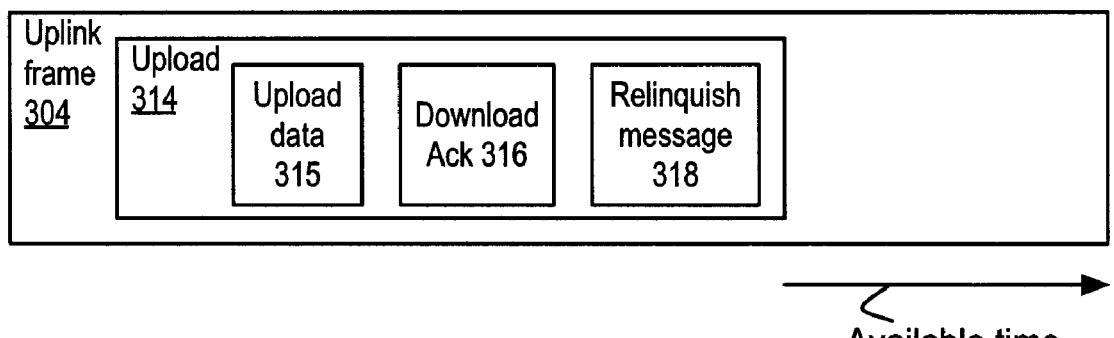

FIG. 21 shows a preferred embodiment of an upload 314 from a station 200 within one of the uplink frames 304, including one or more of an upload data 315, a download acknowledgement 316 of a previously received download from the access point 100, and/or a relinquish message telling the other stations using the access point that the remaining time in the uplink frame is not needed. The upload data may be at least one packet as a data payload and may include error control coding fields.

Figure 22:
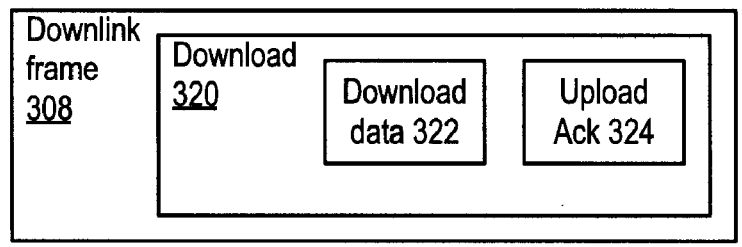

FIG. 22 shows a preferred embodiment of a download 320 from an access point 100 to a station 200 that may include download data 322 and/or an acknowledgement 324 of an upload previously received from the station.

Figure 23:
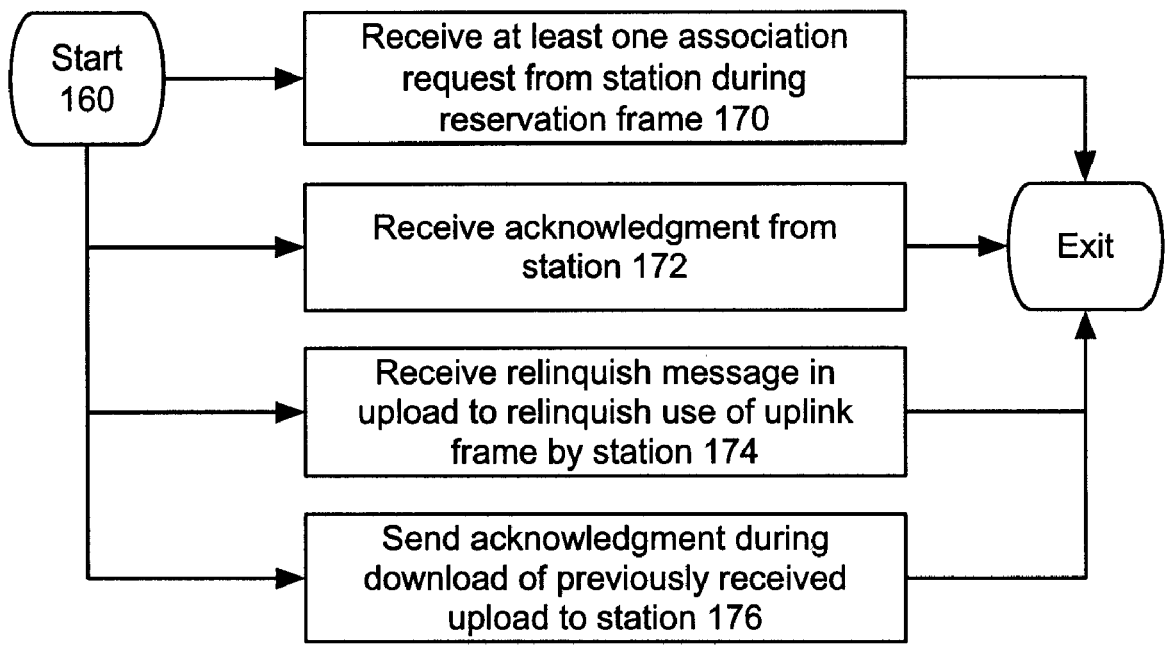
FIG. 23 shows through the example of the first program system how the method of operating the access point may address these refinements to the TDMA protocol shown in FIGS. 20 to 22.

FIG. 23 shows through the example of the first program system 160 how the method of operating the access point 100 may address these refinements to the TDMA protocol shown in FIGS. 20 to 22. Program step 170 directs the receiver 122 or 192 to receive at least one association request from a station 200 during the reservation frame 312. Program step 172 receives an acknowledgement 316 from the station as part of an upload 314. The acknowledgement is of a download 310 previously sent from the access point and received by the station 200. Program step 174 receives a relinquish message from the station to relinquish the rest of the uplink frame 304, freeing up most if not all of its available time. In many embodiments, the channel in use flag interface is directed to assert a pin, which is combined through logical operation with at least one other access point to create a global in-use flag that is made available by the channel in use flag interface 140, frequently as a non-maskable interrupt to the computer 114 or 514. And program step 176 directs the transmitter 120 or 190 to send an acknowledgement 324 of a previously received upload 314 by the station 200.

Figure 24:
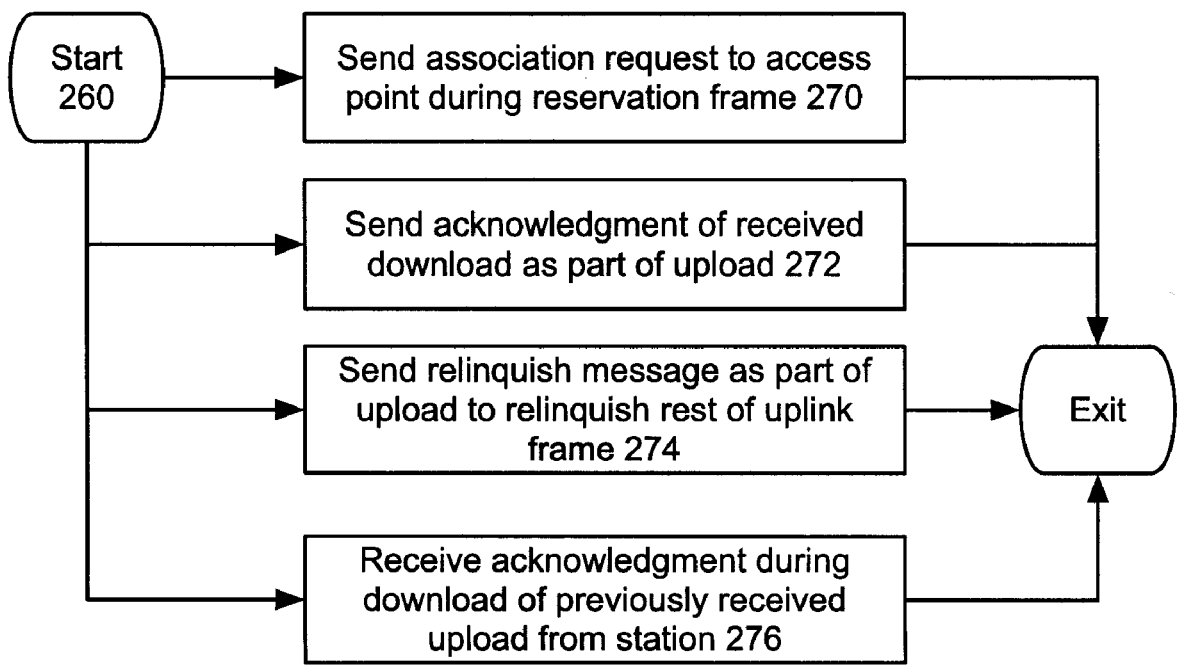
FIG. 24 shows through the example of the second program system how the method of operating the station may address these refinements to the TDMA protocol shown in FIGS. 20 to 22.

FIG. 24 shows through the example of the second program system 260 how the method of operating the station 200 may address these refinements to the TDMA protocol shown in FIGS. 20 to 22. Program step 270 directs the transmitter 220 or 190 to send receive at least one association request from a station 200 during the reservation frame 312. Program step 172 receives an acknowledgement 316 from the station as part of an upload 314. The acknowledgement is of a download 310 previously sent from the access point and received by the station 200. Program step 274 sends a relinquish message from the station to relinquish the rest of the uplink frame 304, freeing up most if not all of its available time. And program step 176 receives an acknowledgement 324 of a previously received upload 314 from the station 200.

The preceding embodiments provide examples of the invention, and are not meant to constrain the scope of the following claims.

What is claimed is:

1. A method comprising:
operating a first access point among a plurality of access points, wherein the access points communicate over a wireline medium using a respective plurality of frequency channels, wherein each of the access points communicates over the wireline medium with a respective set of one or more stations using the respective frequency channel and using a wireless protocol, wherein a first of the access points includes a transmitter and a receiver both compliant to the wireless protocol, wherein said operating the first access point includes:
the first access point sending a beacon and a schedule over said wireline medium to the respective set of one or more stations, wherein the schedule specifies an uplink phase followed by a downlink phase;
the first access point receiving uplink information over the wireline medium from at least one of the one or more stations of the respective set during the uplink phase;
the first access point moving ahead a start time of the downlink phase in response to (a) determining that the one or more stations of the respective set are done with sending uplink information to the first access point and (b) receiving signals from one or more other ones of the access points that their respective sets of stations are done with sending uplink information;
the first access point moving ahead a time of transmission of a next beacon in response to (c) determining that there is no more downlink information to be sent from the first access point to the respective set of one or more stations and (d) receiving signals from the one or more other ones of the access points that they are done with sending downlink information to their respective sets of one or more stations.

2. The method of claim 1, wherein the start time of the uplink phase is the same across all the access points, wherein the start time of the downlink phase is the same across all the access points.

3. The method of claim 1, wherein said operating further comprises:
the first access point receiving a relinquish message over the wireline medium from a first of the one or more stations of the respective set, wherein the relinquish message indicates that the first station relinquishes use of a portion of the uplink phase that has been allocated to the first station by the schedule.

4. The method of claim 1, wherein the access points are synchronized so that none of the access points are receiving from the wireline medium while any of the access points is transmitting onto the wireline medium.

5. The method of claim 1, wherein the wireless protocol is a version of an IEEE 802.11 wireless communications protocol.

6. The method of claim 1, wherein the wireline medium comprises coaxial cable.

7. A method for communicating over a wireline medium, wherein the communication involves an access point and a plurality of stations, the method comprising:
operating a first of the stations in order to communicate over the wireless medium using a wireless protocol and a first frequency channel, wherein the first station includes a transmitter and a receiver both compliant to the wireless protocol, wherein said operating includes:
the first station receiving a beacon and a schedule from the access point over the wireless medium, wherein the schedule specifies an uplink phase followed by a downlink phase, wherein the schedule also specifies a sequence of time frames within the uplink phase and an allocation of the time frames to respective ones of the stations;
the first station receiving a first relinquish message from a second of the stations over the wireless medium, wherein the first relinquish message indicates that the second station relinquishes a first of the time frames that has been allocated to it by the schedule;
the first station updating said allocation to move ahead a subset of the stations with respect to the sequence of time frames, wherein the subset of the stations are those two or more stations that were originally allocated time frames after the first time frame, wherein the first station is a member of the subset of stations;
the first station transmitting uplink information over the wireless medium during the first time frame;
the first station transmitting a second relinquish message over the wireless medium in response to determining that it has no additional uplink information to transmit.

8. The method of claim 7, wherein an additional access point and an additional set of two or more stations communicate over the wireline medium using a second frequency channel, wherein the access point and the additional access point are synchronized so that the uplink phase is the same for both, wherein the access point and the additional access point are synchronized so that the downlink phase is the same for both.

9. The method of claim 8, where the access point transmits the beacon and the schedule during a beacon phase, wherein the additional access point also transmits a second beacon and a second schedule during the beacon phase.

10. The method of claim 7, wherein said wireless protocol is a version of an IEEE 802.11 wireless communications protocol.

11. The method of claim 7, wherein said wireline medium comprises coaxial cable.

12. A chip for operating a first access point among a plurality of access points, the chip comprising:
a transmitter and a receiver both compliant to a wireless protocol;
a processor; and
a memory storing program instructions, wherein the program instructions, when executed by the processor, cause the processor to operate the first access point, wherein the access points communicate over a wireline medium using a respective plurality of frequency channels, wherein each of the access points communicates over the wireline medium with a respective set of one or more stations using the respective frequency channel and using the wireless protocol, wherein said operating the first access point includes:

sending a beacon and a schedule over said wireline medium to the respective set of one or more stations, wherein the schedule specifies an uplink phase followed by a downlink phase;

receiving uplink information over the wireline medium from at least one of the one or more stations of the respective set during the uplink phase;

moving ahead a start time of the downlink phase in response to (a) determining that the one or more stations of the respective set are done with sending uplink information to the first access point and (b) receiving signals from one or more other ones of the access points that their respective sets of stations are done with sending uplink information;

moving ahead a time of transmission of a next beacon in response to (c) determining that there is no more downlink information to be sent from the first access point to the respective set of one or more stations and (d) receiving signals from the one or more other ones of the access points that they are done with sending downlink information to their respective sets of one or more stations.

13. The chip of claim 12, wherein the start time of the uplink phase is the same across all the access points, wherein the start time of the downlink phase is the same across all the access points.

14. The chip of claim 12, wherein said operating the first access point further comprises:

receiving a relinquish message over the wireline medium from a first of the one or more stations of the respective set, wherein the relinquish message indicates that the first station relinquishes use of a portion of the uplink phase that has been allocated to the first station by the schedule.

15. The chip of claim 12, wherein the access points are synchronized so that none of the access points receive from the wireline medium while any of the access points transmits onto the wireline medium.

16. The chip of claim 12, wherein the wireless protocol is a version of an IEEE 802.11 wireless communications protocol.

17. The chip of claim 12, wherein the wireline medium comprises coaxial cable or optical fiber.

18. The chip of claim 12, wherein the signals from the one or more other ones of the access points are sent to the first access point via wired connections different from the wireline medium.

19. A chip for operating a first station among a plurality of stations in order to facilitate communication between the first station and an access point, the chip comprising:

a transmitter and a receiver both compliant to a wireless protocol;

a processor; and a memory storing program instructions, wherein the program instructions, when executed by the processor, cause the processor to operate the first station in order to communicate over the wireless medium using the wireless protocol and a first frequency channel, wherein said operating the first station includes:

receiving a beacon and a schedule from the access point over the wireless medium, wherein the schedule specifies an uplink phase followed by a downlink phase, wherein the schedule also specifies a sequence of time frames within the uplink phase and an allocation of the time frames to respective ones of the stations;

receiving a first relinquish message from a second of the stations over the wireless medium, wherein the first relinquish message indicates that the second station relinquishes a first of the time frames that has been allocated to it by the schedule;

updating said allocation to move ahead a subset of the stations with respect to the sequence of time frames, wherein the subset of the stations are those two or more stations that were originally allocated time frames following the first time frame, wherein the first station is a member of the subset of stations;

transmitting uplink information over the wireless medium during the first time frame;

transmitting a second relinquish message over the wireless medium in response to determining that the first access point has no additional uplink information to transmit.

20. The chip of claim 19, wherein an additional access point and an additional set of two or more stations are configured to communicate over the wireline medium using a second frequency channel, wherein the access point and the additional access point are configured to synchronize so that the uplink phase is the same for both, wherein the access point and the additional access point are configured to synchronize so that the downlink phase is the same for both.

21. The chip of claim 19, where the processor is configured to transmit the beacon and the schedule during a beacon phase, wherein the additional access point is configured to transmit a second beacon and a second schedule during the beacon phase.

22. The chip of claim 19, wherein said wireless protocol is a version of an IEEE 802.11 wireless communications protocol.

23. The chip of claim 19, wherein said wireline medium comprises coaxial cable or optical fiber.

24. The chip of claim 19, wherein the uplink information includes an acknowledgement of a packet of data previously received by the first station from the access point.

* * * * *